(12) United States Patent
Elkatatny et al.

(10) Patent No.: US 11,566,161 B2
(45) Date of Patent: Jan. 31, 2023

(54) METHOD OF REMOVING CALCIUM-CONTAINING WATER-BASED FILTER CAKE USING A BIODEGRADABLE ACID SOLUTION

(71) Applicant: King Fahd University of Petroleum and Minerals, Dhahran (SA)

(72) Inventors: Salaheldin Elkatatny, Dhahran (SA); Mohamed Mahmoud, Dhahran (SA); Abdullah Sultan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/733,495

(22) Filed: Jan. 3, 2020

(65) Prior Publication Data

US 2021/0207020 A1 Jul. 8, 2021

(51) Int. Cl.
| | |
|---|---|
| *C09K 8/528* | (2006.01) |
| *C09K 8/035* | (2006.01) |
| *C09K 8/03* | (2006.01) |
| *C09K 8/524* | (2006.01) |

(52) U.S. Cl.
CPC ............ *C09K 8/528* (2013.01); *C09K 8/032* (2013.01); *C09K 8/035* (2013.01); *C09K 8/524* (2013.01); *C09K 2208/06* (2013.01)

(58) Field of Classification Search
CPC ........ C09K 8/528; C09K 8/032; C09K 8/035; C09K 8/524; C09K 2208/06
See application file for complete search history.

(56) References Cited

U.S. PATENT DOCUMENTS

| | | | |
|---|---|---|---|
| 9,587,165 B2 | 3/2017 | Al-Mutairi et al. | |
| 2002/0117457 A1* | 8/2002 | Benton | C09K 8/06 210/749 |
| 2006/0137879 A1 | 6/2006 | Chan | |
| 2010/0160189 A1* | 6/2010 | Fuller | C09K 8/508 507/239 |
| 2013/0146295 A1 | 6/2013 | Moajil et al. | |
| 2018/0155601 A1 | 6/2018 | Brege et al. | |

FOREIGN PATENT DOCUMENTS

| | | |
|---|---|---|
| CN | 100549126 C | 10/2009 |
| CN | 102120930 A | 7/2011 |
| WO | 2006/117517 A2 | 11/2006 |

OTHER PUBLICATIONS

Moajil, et al.; Removal of Manganese Tetraoxide Filter Cake Using Combination of HCl and Organic Acid; Society of Petroleum Engineers; 2013; Abstract Only; 2 Pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

A method of removing calcium-containing water-based filter cake from a wellbore involving contacting the calcium-containing filter cake with a biodegradable acid solution of water, hydrochloric acid, formic acid, citric acid, and a surfactant. The method is performed at a pressure of 200 to 400 psi and a temperature of 50 to 125° C. The method removes calcium-containing filter cake made of water, calcium carbonate, a polymer or starch and a clay. The method meets industry standard steel corrosion rates of less than 0.049 lb/ft$^2$ per day. Also disclosed is a biodegradable acid solution of water, hydrochloric acid, formic acid, citric acid, and a surfactant that meets OECD 301B thresholds for ready biodegradability.

19 Claims, 3 Drawing Sheets

Fig. 3A.                      Fig. 3B.
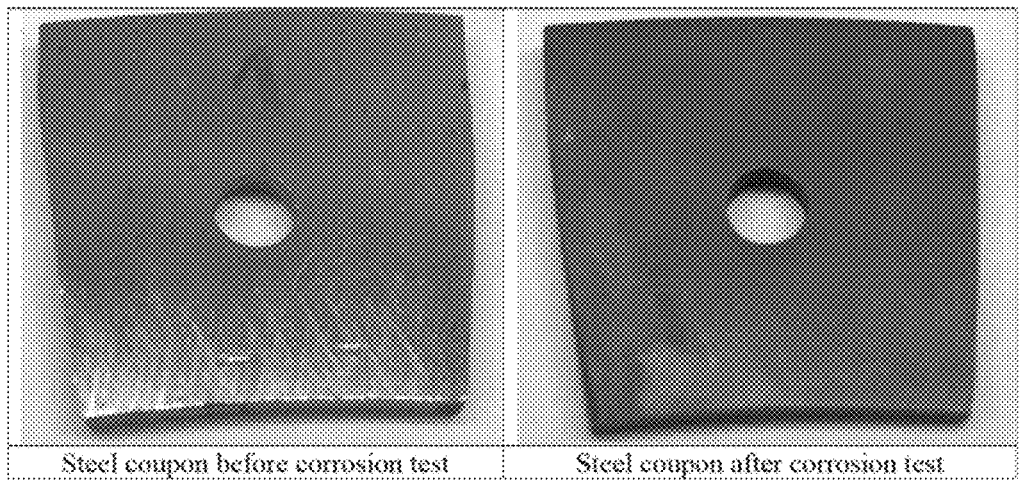
Fig. 4.
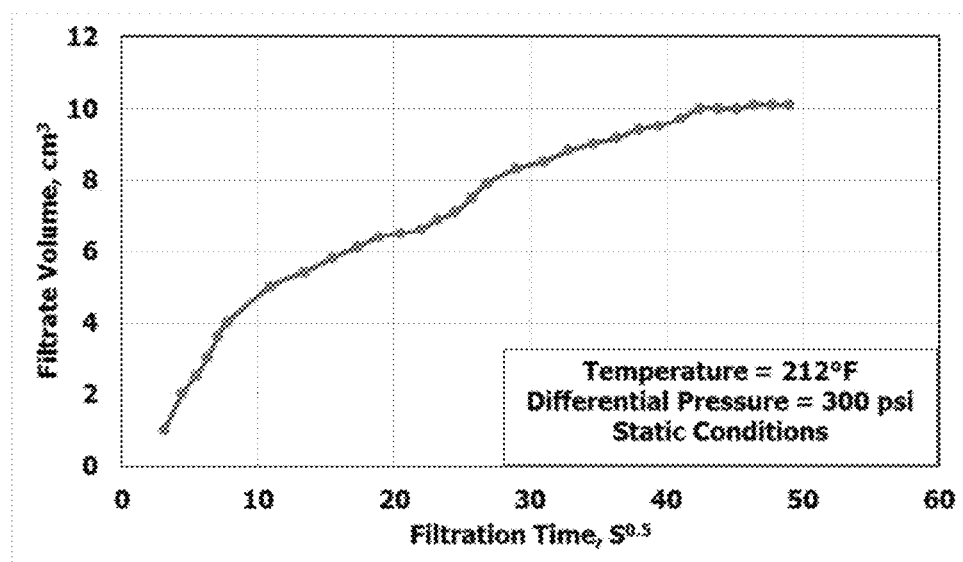
Fig. 5A.                  Fig. 5B.                  Fig. 5C.
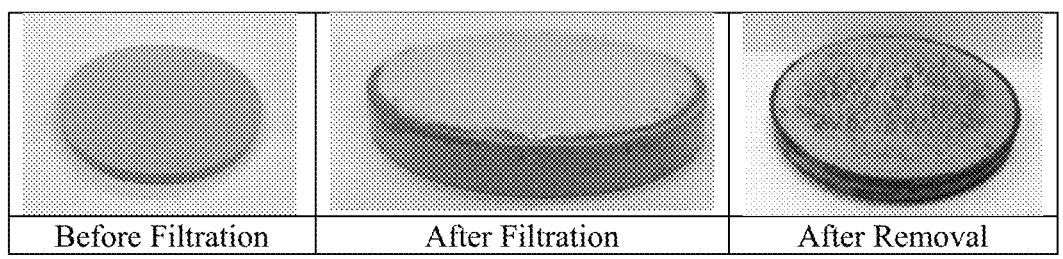

Fig. 6A.
Fig. 6B.
Fig. 6C.
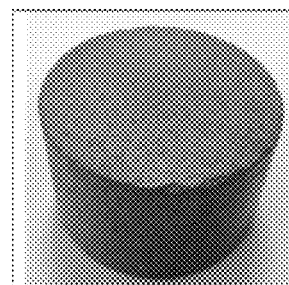
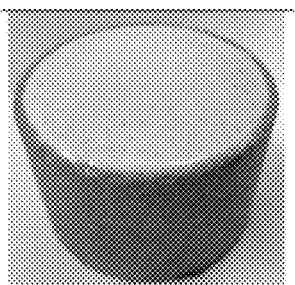
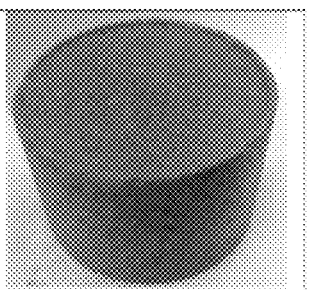
Before Filtration
After Filtration
After Removal
Fig. 7.
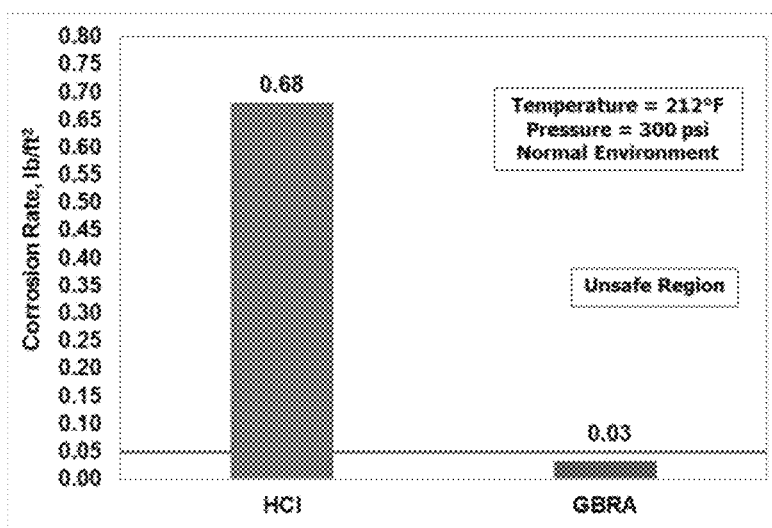

METHOD OF REMOVING CALCIUM-CONTAINING WATER-BASED FILTER CAKE USING A BIODEGRADABLE ACID SOLUTION

BACKGROUND OF THE INVENTION

Technical Field

The present invention relates to a method of removing calcium-containing water-based filter cake using a biodegradable acid solution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids are mixtures of several suspended and dissolved solids and liquids. Solids are present as discontinuous phases spread on the liquid (continuous) phase. The liquid could be a water in cases of water-based drilling fluids (WBDF) or oil in cases of oil-based drilling fluids (OBDF). During the drilling operations, the drilling fluids must achieve different objectives including lubrication of the drill bit and drill string [Gordon, C., et. al., 2008, AADE Fluids Conference and Exhibition, AADE-08-DF-HO-09], transfer of the drilled cuttings to the surface while drilling and suspension of these cuttings when drilling is stopped [Fink, J. K., 2012. Petroleum engineer's guide to oil field chemicals and fluids. Waltham, Mass.: Gulf Professional Pub], preventing formation fluids from invading the wellbore hole, and ensuring the wellbore stability by creating a low permeability film on the borehole's wall under an overbalance condition called filter cake [Bourgoyne Jr., A. T., et. al., 1986, Applied Drilling Engineering; Rabia, H., 2001. Well Engineering and Construction. Entrac Consulting; and Hossain, M., and Al-Majed, A. A., 2015. Fundamentals of Sustainable Drilling Engineering. John Wiley & Sons].

In order for the drilling mud to prevent blowout and suppress the formation pressure, the drilling mud formulation usually involves a weighting material such as barite, hematite, manganese tetroxide, calcium carbonate, potassium formate, which is added to the drilling fluid to obtain the desired density [Rugang, Y., et. al., 2014, Powder Technology, 262, 51-61].

Consequently, these high-weight additives are the main source for most of the formation damage related problems, especially in the producing zones, and have a considerable effect on the filter cake composition.

Filter cake is an impermeable thin layer with a permeability from 0.01 to 0.0001 and [Hanssen, J. E., et. al., 1999, SPE International Symposium on Oilfield Chemistry, SPE 50709-MS] which forms over the face of the permeable formation [Civan, F., 1994, Society of Petroleum Engineers International Petroleum Conference and Exhibition of Mexico] as shown in FIG. 1. Formation of the filter cake is required to stabilize the drilled formations, minimize the drilling fluids filtration into the drilled formations [Ba Geri, B. S., et. al., 2015, International Petroleum Technology Conference, IPTC; and Ba Geri, B. S., et. al., 2016, Journal of Energy Resources Technology, 138, 3, 32901], and reduce solid particle invasion into the oil-bearing formations [Ba Geri, B., et. al., 2013, SPE Middle East Unconventional Gas Conference & Exhibition]. However, after the drilling operation, the drilling fluids and the filter cake must be removed from the wellbore before the start of production operations to enable a successful primary cement job and to prevent impeding of the flow of oil at the wellbore [Fink, J., 2015, Petroleum Engineer's Guide to Oil Field Chemicals and Fluids, Second Edition, Gulf Professional Publishing, Chapter 9, 299-316].

Pre-flush fluids are fluids specially designed to be injected after drilling and before injection of the cement slurry in order to thoroughly remove the remaining mud from the annular space [McDonald, M., et. al., 2014, AADE Fluids Technical Conference and Exhibition, AADE-14-FTCE-55]. These fluids are designed to be efficient in cleaning the drilling mud, chemically compatible with drilling mud and cement slurry, able to prevent sludge or emulsion formation, and able to correct the formation rock wettability in some cases [Quintero, L., et. al., 2008, AADE Fluids Conference and Exhibition, AADE-08-DF-HO-01]. Some pre-flush fluids may also be designed to remove filter cake.

Filter cake removal is a complicated task since the filter cake layer has different structural characteristics for different drilling fluid types (i.e. water-based or oil-based drilling fluids) and different drilling fluid additives [Rugang, Y., et. al., 2014, Powder Technology, 262, 51-61].

Around 70 to 80 wt % of the filter cake layer is formed by the weighting material [Ba Geri, B. S., et. al., 2013, SPE/IADC Drilling Conference, SPE/IADC163519; and Ba Geri, B. S., et. al., 2017, SPE Middle East Oil & Gas Show and Conference, SPE-183653-MS], therefore, filter cake removal efficiency depends mainly on the solubility of the weighting material in the treatment chemical. Another factor that can complicate the removal of the filter cake is the compatibility of the removing chemical or acid with the polymer breaker. If these are not compatible, a two-step method may be necessary to remove the filter cake.

Rostami and Nasr-El-Din [Rostami, A., et. al., 2010, SPE Russian Oil and Gas Conference and Exhibition, SPE-136400-MS] disclosed a new self-destructing $CaCO_3$-weighted water-based drilling fluid based on polylactic acid (PLA) which is an polyester that liberates lactic acid and alcohol when dissolved in water. The PLA used mainly aided to dissolve the $CaCO_3$ in the filter cake body after hydrolysis with water. The cleaning solution was able to remove 75 to 78 wt % of the filter cake created by the new self-destructing drilling mud which is considerably higher than the base drilling fluid.

Mahapatra and Kosztin [Mahapatra, S. K., et. al., 2011, Society of Petroleum Engineers. doi:10.2118/142832-MS] examined the use of $MgO_2$ as an internal breaker for $CaCO_3$ based filter cakes. Soaking different filter cakes formed by different drilling fluid containing varying concentrations of $MgO_2$ particles in 15% HCl solution for 2 hrs indicated that the inclusion of 10% of $MgO_2$ particles enhances the efficiency of the 15% HCl solution for filter cake removal. Applying the drilling mud formulation in three oil wells in the South Oman field showed good results in two of the three wells where the actual oil production rate from these two wells exceeded the expected rate.

Elkatatny and Nasr-El-Din [Elkatatny S. M., Nasr-El-Din, H. A., 2014, International Journal of Oil, Gas and Coal Technology, 7, 169-181] proposed a low pH glutamate diacetate (GLDA)-based formulation for removal of calcium carbonate filter cake in a two stage process. The two-stage process was recommended because of the incompatibility between the GLDA and the polymer breaker. In a first stage, 10 wt % of amylase enzyme was used to break the polymer, while in the second stage, GLDA at 3.3 pH was used as a treatment solution.

Ba Geri et al. [Ba Geri, B. S., et. al., 2016, Journal of Energy Resources Technology 138, 3, 32901] studied the effect of sandstone particles on $CaCO_3$ drilling fluid filter cake removal during drilling a horizontal lateral in a sandstone reservoir. They concluded that the dissolution rate of the $CaCO_3$ in GLDA treatment fluid at pH of 3.8 was decreased from 100% to 80% when the filter cake layer contained 20 wt % of sandstone.

Elkatatny and Mahmoud [Elkatatny, S. M. and Mahmoud, M., 2018, Arabian Journal for Science and Engineering, 43, 5, 2309-2318] investigated enzyme compatibility with different EDTA solutions of 20 wt % concentrations and different pH for the removal of $CaCO_3$ filter cake. Three different chelating agents of EDTA and DTPA at pH of 7 and 12 and GLDA at pH of 4, 7 and 12 were used. The use chelating agent solutions alone was not able to remove the starch after soaking for 12 hrs, which indicates that the use of enzyme is a must to break down the polymer. The HTA enzyme broke down the starch completely after 6 hrs of reaction. The compatibility study confirmed that all the chelating agents considered were not compatible with the HTA enzyme which indicates that the treatment must be conducted in two stages. The two stages process was able to remove the $CaCO_3$ filter cake with 100% efficiency.

In view of the foregoing, one objective of the present invention is to provide an efficient, one-step, method for the removal of a calcium-containing water-based filter cake using a biodegradable acid solution. The method achieves high removal efficiency while leaving geological formations undamaged and surpassing industry requirements for low steel corrosion rate. Another objective is to provide a biodegradable acid solution for the removal of calcium-containing water-based filter cake. The solution meets OECD 301B requirements for ready biodegradability.

BRIEF SUMMARY OF THE INVENTION

According to a first aspect, the present disclosure relates to a method for removing a calcium-containing filter cake from a wellbore involving contacting the calcium-containing filter cake with a biodegradable acid solution comprising 69.5 to 93.375 wt % of water, 5 to 20 wt % of hydrochloric acid, 0.75 to 7.5 wt % of formic acid, 0.75 to 7.5 wt % of citric acid, and 0.0075 to 0.75 wt % of a surfactant, each based on a total weight of the biodegradable acid solution, the contacting occurring at a pressure of 200 to 400 psi, and the calcium-containing filter cake comprising water, calcium carbonate, a polymer or starch, and a clay.

In some embodiments, the calcium-containing filter cake is substantially free of an oil.

In some embodiments, the biodegradable acid solution has a density of 0.90 to 1.25 g/cm³ at 20 to 30° C.

In some embodiments, the biodegradable acid solution has a viscosity of 1.5 to 1.7 cP at 20 to 30° C.

In some embodiments, the biodegradable acid solution has a surface tension of 30 to 33 mN/m at 20 to 30° C.

In some embodiments, the biodegradable acid solution has a pH of −1.5 to −1.1 at 20 to 30° C.

In some embodiments, the contacting is performed at a temperature of 50 to 125° C.

In some embodiments, the contacting is performed for 1 to 48 hours.

In some embodiments, the method removes the calcium-containing filter cake while causing a corrosion rate of steel of less than 0.049 lb/ft² per day at 50 to 125° C.

In some embodiments, a volume ratio of the biodegradable acid solution to the calcium-containing filter cake being contacted is 5:1 to 50:1.

In some embodiments, greater than 92.5% of a volume of the calcium-containing filter cake is removed.

In some embodiments, removing the calcium-containing filter cake from the wellbore increases the permeability of the wellbore by 90 to 100%.

In some embodiments, the biodegradable acid solution reaches a plateau of 75 to 99% of theoretical $CO_2$ by day 40 according to OECD 301B biodegradation test.

The present disclosure also relates to a biodegradable acid solution, comprising 69.5 to 93.375 wt % of water, 5 to 20 wt % of hydrochloric acid, 0.75 to 7.5 wt % of formic acid, 0.75 to 7.5 wt % of citric acid, and 0.0075 to 0.75 wt % of a surfactant, each based on a total weight of the biodegradable acid solution.

In some embodiments, the biodegradable acid solution has a density of 0.90 to 1.25 g/cm3 at 20 to 30° C.

In some embodiments, the biodegradable acid solution has a viscosity of 1.5 to 1.7 cP at 20 to 30° C.

In some embodiments, the biodegradable acid solution has a surface tension of 30 to 33 mN/m at 20 to 30° C.

In some embodiments, the biodegradable acid solution has a pH of −1.5 to −1.1 at 20 to 30° C.

In some embodiments, the biodegradable acid solution has a steel corrosion rate of less than 0.049 lb/ft² per day at 50 to 125° C.

In some embodiments, the biodegradable acid solution reaches a plateau of 75 to 99% of theoretical $CO_2$ by day 40 according to OECD 301B biodegradation test.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B show the steel coupon used in the corrosion rate test, where 3A is the steel coupon before the corrosion rate test, and 3B is the steel coupon after the corrosion rate test;

FIG. 4 shows the volume of deposited filtrate vs the square root of time for water-based calcium carbonate filter cake;

FIGS. 5A-5C shows a ceramic disk, where 5A is the disk before filter cake deposition, 5B is the disk after filter cake deposition, and 5C is the disk after filter cake removal with the GBRA;

FIGS. 6A-6C shows a core of Indiana limestone, where 6A is the core before filter cake deposition, 6B is the core after filter cake deposition, and 6C is the core after filter cake removal with the GBRA;

FIG. 7 shows a comparison of the corrosion rate of steel for the GBRA and 10 vol % HCl.

DETAILED DESCRIPTION OF THE INVENTION

Figure 1:
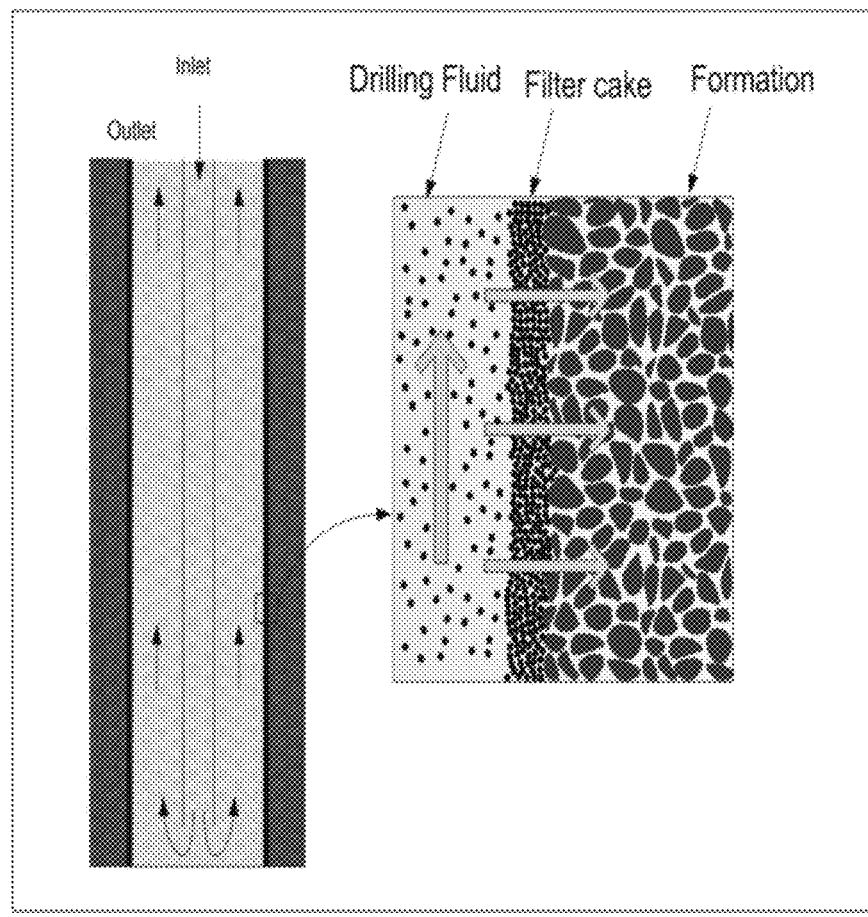
FIG. 1 is a depiction of the formation of a filter cake at the surface of a geological formation.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

According to a first aspect, the present disclosure relates to a method for removing a calcium-containing filter cake from a wellbore. The method involves contacting the calcium-containing filter cake with a biodegradable acid solution.

Biodegradable Acid Solution

The biodegradable acid solution comprises, consists essentially of, or consists of, hydrochloric acid, formic acid, citric acid, a surfactant and water. In some embodiments, the hydrochloric acid is present in an amount of 5 to 20 wt %, preferably 5 to 17.5 wt %, preferably 7.5 to 15 wt %, preferably 8 to 12.5 wt %, preferably 9 to 11 wt %, preferably 9.5 to 10.5 wt %, preferably 10 wt % based on a total weight of the biodegradable acid solution. In some embodiments, the formic acid is present in an amount of 0.75 to 7.5 wt %, preferably 0.9 to 6 wt %, preferably 1 to 5 wt %, preferably 1.1 to 3.5 wt %, preferably 1.25 to 3 wt %, preferably 1.4 to 2.75 wt %, preferably 1.5 to 2.5 wt % based on a total weight of the biodegradable acid solution. In some embodiments, the citric acid is present in an amount of 0.75 to 7.5 wt %, preferably 0.9 to 6 wt %, preferably 1 to 5 wt %, preferably 1.1 to 3.5 wt %, preferably 1.25 to 3 wt %, preferably 1.4 to 2.75 wt %, preferably 1.5 to 2.5 wt % based on a total weight of the biodegradable acid solution.

In some embodiments, a weight ratio of the formic acid to the citric acid present in the biodegradable acid solution is 10:1 to 1:10, preferably 7:1 to 1:7, preferably 5:1 to 1:5, preferably 3.2:1 to 1:3.2, preferably 2.5:1 to 1:2.5, preferably 2:1 to 1:2, preferably 1.5:1 to 1:1.5, preferably 1.25:1 to 1:1.25, preferably 1:1. While other acids may be used, preferably they are not. Examples of other acids which may be used include acetic acid, propionic acid, hydrobromic acid, hydroiodic acid, chloric acid, perchloric acid, sulfuric acid, sulfurous acid, and phosphoric acid. Certain other acids, however, may not be used. Examples of other acids that may not be used include hydrofluoric acid, silicic acid, orthosilicic acid, fluorosilicic acid, and hexafluorophosphoric acids.

A surfactant molecule comprises one or more hydrophilic head units attached to one or more hydrophobic tails. The tail of most surfactants comprises a hydrocarbon chain, which can be branched, linear, or aromatic. Fluor surfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, sultaine and sultaine derivatives, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3-(CH_2)_{10-16}-(O-C_2H_4)_{1-25}-OH$, such as octaethylene glycol monododecyl ether and pentaethylene glycol monododecyl ether; polypropylene glycol alkyl ethers having the formula: $CH_3-(CH_2)_{10-16}-(O-C_3H_6)_{1-25}-OH$; glucoside alkyl ethers having the formula $CH_3-(CH_2)_{10-16}-(O\text{-glucoside})_{1-3}\text{-OH}$, such as decyl glucoside, lauryl glucoside, octyl glucoside; polyethylene glycol octylphenyl ethers having the formula $C_8H_{17}-(C_6H_4)-(O-C_2H_4)_{1-25}-OH$, such as Triton X-100; polyethylene glycol alkylphenyl ethers having the formula $C_9H_{19}-(C_6H_4)-(O-C_2H_4)_{1-25}-OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the surfactant is an ionic surfactant. In some embodiments, the ionic surfactant is an anionic surfactant. In some embodiments, the anionic surfactant is sodium dodecyl sulfate.

In some embodiments, the surfactant is present in an amount of 0.0075 to 0.75 wt %, preferably 0.01 wt % to 0.7 wt %, preferably 0.05 to 0.65 wt %, preferably 0.075 to 0.50 wt %, preferably 0.1 to 0.4 wt %, preferably 0.15 to 0.35 wt %, preferably 0.175 to 0.325 wt %, preferably 0.2 to 0.3 wt %, preferably 0.225 to 0.275 wt %, preferably 0.25 wt % based on a total weight of biodegradable acid solution.

In some embodiments, the water is present in an amount of 69.5 to 93.375 wt %, preferably 70 to 93 wt %, preferably 72.5 to 92 wt %, preferably 75 to 90 wt %, preferably 77.5 to 89 wt %, preferably 80 to 88.5 wt %, preferably 82.5 to 88 wt %, preferably 83 to 87.5 wt %, preferably 84 to 87 wt %, preferably 84.75 to 86.75 wt % based on a total weight of the biodegradable acid solution.

In some embodiments, the biodegradable acid solution has a density of 0.90 to 1.25 $g/cm^3$, preferably 0.91 to 1.24 $g/cm^3$, preferably 0.92 to 1.23 $g/cm^3$, preferably 0.93 to 1.22 $g/cm^3$, preferably 0.94 to 1.21 $g/cm^3$, preferably 0.95 to 1.20 $g/cm^3$, preferably 0.96 to 1.19 $g/cm^3$, preferably 0.97 to 1.18 $g/cm^3$, preferably 0.98 to 1.17 $g/cm^3$, preferably 0.99 to 1.16 $g/cm^3$, preferably 1.00 to 1.15 $g/cm^3$, preferably 1.01 to 1.14 $g/cm^3$, preferably 1.02 to 1.13 $g/cm^3$, preferably 1.03 to 1.12, preferably 1.04 to 1.11 $g/cm^3$, preferably 1.05 to 1.10 $g/cm^3$ at 20 to 30° C., preferably 22.5 to 27.5° C., preferably 23 to 27° C., preferably 25° C. In some embodiments, the biodegradable acid solution has a viscosity of 1.5 to 1.7 cP, preferably 1.51 to 1.65 cP, preferably 1.52 to 1.64 cP, preferably 1.53 to 1.63 cP, preferably 1.54 to 1.62 cP, preferably 1.55 to 1.61 cP, preferably 1.56 to 1.59 cP, preferably 1.57 to 1.58 cP at 20 to 30° C., preferably 22.5 to 27.5° C., preferably 23 to 27° C., preferably 25° C. In some embodiments, the biodegradable acid solution has a surface tension of 30 to 33 mN/m, preferably 30.25 to 32.75 mN/m, preferably 30.5 to 32.5 mN/m, preferably 30.75 to 32.25 mN/m, preferably 31 to 32 mN/m, preferably 31.1 to 31.8 mN/m, preferably 31.2 to 31.6 mN/m, preferably 31.3 to 31.5 mN/m, preferably 31.4 mN/m at 20 to 30° C., preferably 22.5 to 27.5° C., preferably 23 to 27° C., preferably 25° C. In some embodiments, the biodegradable acid solution has a pH of −1.5 to −1.1, preferably −1.45 to −1.15, preferably −1.4 to −1.2, preferably −1.35 to −1.22, preferably −1.32 to −1.25, preferably −1.31 to −1.27, preferably −1.30 to −1.28, preferably −1.29 20 to 30° C., preferably 22.5 to 27.5° C., preferably 23 to 27° C., preferably 25° C.

In some embodiments, the biodegradable acid solution may be formed by adding and mixing components that comprise the biodegradable acid solution in any order, and then continuing to mix until a stable, uniform mixture is formed. In one embodiment, the biodegradable acid solution may be formed by starting with a solvent, such as water, brine, seawater, or freshwater, adding a component, mixing to uniformity, and then repeating for the remaining steps. Alternatively, two or more components may be added at a time and mixed, and in one embodiment, the biodegradable acid solution may be heated while mixing, for example, to a temperature of 110 to 200° F., preferably 150 to 180° F., in order to more quickly dissolve certain components. The mixing may be performed by flowing through or across a static mixer, or with a turbine, blade, impeller, drum mixer, stir bar, paddle, or through some other form of agitation or blending.

Method for Removing Calcium-Containing Filter Cake

Filter cake refers to solid residue that is deposited in a wellbore after drilling. Filter cake comprises solid material present in drilling fluid. Filter cake, also called mud cake, mudcake, and wall cake, is typically classified as either water-based filter cake or oil-based filter cake, depending on the composition of the drilling fluid the filter cake is derived from. Water-based filter cakes are derived from water-based drilling fluids that do not contain an oil or emulsion phase. Oil-based filter cakes are derived from oil-based drilling fluids that typically contain both oil and water or both oil and an emulsion phase. Examples of components of water-based filter cake are particulate inorganic materials, aluminosilicates, clays, alkalinity control agents, clay stabilizing agents, viscosity control agents, fluid loss control agents, oxygen scavengers such as sulfite salts or bisulfite salts, and foam control agents. Examples of particulate inorganic materials are calcium sulfate, calcium carbonate, barium sulfate, iron (II, III) oxide ($Fe_3O_4$), iron (III) oxide ($Fe_2O_3$), manganese (IV) oxide ($MnO_2$), and manganese (II, III) oxide ($Mn_3O_4$). Examples of aluminosilicates are andalusite, kyanite, sillimanite, zeolites, kaolinite, and mullite. Examples of clays are bentonite, montmorillonite, illite, chlorite, and smectite. Examples of alkalinity control agents include potassium hydroxide, sodium hydroxide, ammonium hydroxide, and lithium hydroxide. Examples of clay stabilizing agents include lithium chloride, sodium chloride, potassium chloride, potassium acetate, and potassium formate. Examples of viscosity control agents are synthetic polymers such as polyacrylates, polyacrylamides, and polyalphaolefins, celluloses such as cellulose, carboxymethylcellulose, and sulphoethylcellulose, and natural gums such as xantham gum and guar gum. Examples of fluid loss control agents include starches, chemically modified starches, and copolymers such as AMPS-acrylamide, styrene-butadiene rubber, and acrylamide/acrylic acid. These copolymers may be block copolymers, gradient copolymers, random copolymers, alternating copolymers, or graft copolymers.

In some embodiments, the calcium-containing filter cake is a water-based filter cake. In some embodiments, the calcium-containing filter cake comprises calcium carbonate, a polymer or starch, a clay stabilizing agent, a viscosity control agent, and water. In some embodiments, calcium carbonate is present in an amount of 10 to 95 wt %, preferably 15 to 90 wt %, preferably 25 to 87.5 wt %, preferably 35 to 85 wt %, preferably 45 to 82.5 wt % based on a total weight of the calcium-containing filter cake on a dry basis. In some embodiments, the remaining wt % of the total weight of the calcium-containing filter cake comprises a clay, a polymer or starch, a clay stabilizing agent, a viscosity control agent, and water. In some embodiments, the clay stabilizing agent is potassium chloride. In some embodiments, the viscosity control agent is xantham gum. In some embodiments, the calcium-containing filter cake further comprises a defoamer. In some embodiments, the calcium-containing filter cake further comprises an oxygen scavenger. In some embodiments, the calcium-containing filter cake is substantially free of an oil.

In some embodiments, the calcium-containing filter cake has a mean thickness of 0.5 to 10 mm, preferably 0.6 to 9 mm, preferably 0.75 to 8 mm, preferably 1 to 7 mm, preferably 1.25 to 6 mm, preferably 1.5 to 5 mm, preferably 1.75 to 4 mm, preferably 2 to 3.5 mm.

In some embodiments, the contacting is performed at a pressure of 200 to 400 psi, preferably 210 to 390 psi, preferably 220 to 380 psi, preferably 230 to 370 psi, preferably 240 to 360 psi, preferably 250 to 350 psi, preferably 260 to 340 psi, preferably 270 to 330 psi, preferably 280 to 320 psi, preferably 290 to 310 psi, preferably 300 psi. In some embodiments, the contacting is performed at a temperature of 50 to 125° C., preferably 60 to 120° C., preferably 70 to 115° C., preferably 80 to 110° C., preferably 90 to 105° C., preferably 95 to 102.5° C., preferably 100° C. In some embodiments, the contacting is performed for 1 to 48 hours, preferably 4 to 44 hours, preferably 8 to 40 hours, preferably 12 to 36 hours, preferably 14 to 34 hours, preferably 16 to 32 hours, preferably 18 to 30 hours, preferably 19 to 24 hours, preferably 20 hours.

In some embodiments, a volume ratio of the biodegradable acid solution to the calcium-containing filter cake being contacted is 5:1 to 50:1, preferably 7.5:1 to 45:1, preferably 10:1 to 40:1, preferably 12.5:1 to 35:1, preferably 15:1 to 30:1, preferably 17.5:1 to 25:1, preferably 19:1 to 22.5:1, preferably 20:1. In some embodiments, greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99% of a volume of the calcium-containing filter cake is removed by the method. In some embodiments, the method removes the calcium-containing filter cake without causing damage to or degrading a porous geological formation. Such damage or degradation may be detected by measuring the porosity of the porous geological formation before occlusion by the calcium-containing filter cake, then measuring the porosity after removal of the calcium-containing filter cake. A porosity after removal of the calcium-containing filter cake that is higher than the porosity before occlusion by the calcium-containing filter cake indicates that damage or degradation has occurred. In some embodiments, the porosity after removal of the calcium-containing filter cake that is approximately equal to than the porosity before occlusion by the calcium-containing filter cake. In some embodiments, the porosity after removal of the calcium-containing filter cake that is 0 to 10% less than, preferably 1 to 9% less than, preferably 2 to 8% less than, preferably 3 to 7% less than the porosity before occlusion by the calcium-containing filter cake.

In some embodiments, the calcium-containing filter cake is removed by dissolving. Dissolving a calcium-containing filter cake, as described here, means that the calcium-containing filter cake may break apart, partially or completely dissolve, disperse, or disintegrate from a surface of a wellbore or other porous surface or from a portion of a calcium-containing filter cake. A method to dissolve a calcium-containing filter cake may be considered a "treatment," or a method of "treating" or "removing" a calcium-containing filter cake from a surface. In some embodiments, the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. In some embodiments, the dissolving and removing of a calcium-containing filter cake as described by the method is a result of the components of the biodegradable acid solution reacting with different compounds within the calcium-containing filter cake, as previously described. In some embodiments, the dissolving and removing may also result from the physical turbulence or flow of fluids against the calcium-containing filter cake, or by diffusion of a fluid into a calcium-containing filter cake or between a calcium-containing filter cake and the surface.

In practice, the method of removing a calcium-containing filter cake from a wellbore can be applied in various ways. For example, the biodegradable acid solution can be injected into the wellbore to dissolve the calcium-containing filter cake within. Alternatively, the biodegradable acid solution can be injected directly at the site of a calcium-containing filter cake. Alternatively, the biodegradable acid solution can be allowed to circulate in the wellbore for a certain period of time. Alternatively, the biodegradable acid solution may be left in the wellbore to soak the calcium-containing filter cake. Alternatively, the wellbore containing the calcium-containing filter cake may be pre-washed by water and/or mutual solvent and/or pretreated with a surfactant before being treated with the biodegradable acid solution. In some embodiments, the biodegradable acid solution is used in a diluted form. In some embodiments, the biodegradable acid solution is diluted with water. In alternative embodiments, the biodegradable acid solution is not used in a diluted form.

The method of the present disclosure is applicable in numerous different environments. It can be used to remove calcium-containing filter cake produced from drilling, production, completion, workover, or stimulation activity, either produced intentionally or unintentionally. It can be used in screen-only completions or gravel pack completions, an open hole or a cased hole, vertical or highly deviated wells. The biodegradable acid solution may be used as single-application soak or circulating fluid in which the biodegradable acid solution also serves as a carrier fluid for, e.g., a gravel pack operation; in conjunction with a gelling agent or viscoelastic surfactant (e.g., ClearFRAC™) or alone, with a variety of clean-up tools and other fluid additives (e.g., anti-corrosive agents) or dissolution components. Since the problem of placement and uniform dissolution are present in virtually every instance, the biodegradable acid solution and method of the present disclosure are readily applicable to any scenario in which it is desirable to remove a calcium-containing filter cake from a wellbore or near-wellbore region in a formation, regardless of whether the calcium-containing filter cake is produced during drilling or during other post-drilling operations (e.g., fluid-loss control pill, gravel pack operation, fracturing, matrix acidizing, and so forth).

Following the contacting, in some embodiments, the method may further comprise a step of flushing away a dispersed calcium-containing filter cake with a low concentration of organic or non-organic acid as commonly known in the art to increase permeability.

Filter cake removal methods must not be overly damaging to the material of a geological formation or the material of the wellbore, production pipe, or other equipment associated with oil extraction. One standardized way of quantifying such damage is too measure the corrosion rate of steel under conditions used in the filter cake removal method. Various test standards and protocols have been developed for determining the corrosion rate. A standard benchmark is that the method causes a corrosion rate of steel less than 0.05 $lb/ft^2$ of exposed steel per day under the conditions of the method. In some embodiments, the method removes the calcium-containing filter cake while causing a corrosion rate of steel less than 0.049 $lb/ft^2$ per day, preferably less than 0.045 $lb/ft^2$ per day, preferably less than 0.040 $lb/ft^2$ per day, preferably less than 0.038 $lb/ft^2$ per day, preferably less than 0.036 $lb/ft^2$ per day, preferably less than 0.034 $lb/ft^2$ per day, preferably less than 0.032 $lb/ft^2$ per day at a temperature of 50 to 125° C., preferably 60 to 120° C., preferably 70 to 115° C., preferably 80 to 110° C., preferably 90 to 105° C., preferably 95 to 102.5° C., preferably 100° C.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength. More preferably, the physical properties and chemical composition of the carbon steel are suitable for application in subterranean formations, including elevated temperatures and pressures, flow of gases, fluids and solids and the presence of corrosive gases. Preferred carbon steels are carbon steels wherein at least one of manganese or chromium is present in an amount of 0.75 wt % in relation to the total steel alloy weight. These carbon steels include, but are not limited to, N-80, L-80, P-110, Q-125, J-55, C-75, C-90, C-95, QT-800, QT-900, 5LX-42, and 5LX-52 carbon steels.

In one embodiment the steel is low-carbon steel, which contains up to 0.30 wt % carbon with respect to a total weight of the steel alloy. The carbon content for high-formability steels is less than 0.10 wt % of carbon, with up to 0.4 wt % manganese with respect to a total weight of the steel alloy. For rolled steel structural plates and sections, the carbon content may be increased to approximately 0.30 wt %, with higher manganese content up to 1.5 wt %. These materials may be used for stampings, forgings, seamless tubes, and boiler plates.

In another embodiment the steel is medium-carbon steel, with medium-carbon steels being similar to low-carbon steels except that the carbon content ranges from 0.30 to 0.60 wt % and the manganese content ranges from 0.60 to 1.65 wt % with respect to a total weight of the steel alloy.

In yet another embodiment the steel is a high-carbon steel, with high-carbon steels containing from 0.60 to 1.00 wt % of carbon with manganese contents ranging from 0.30 to 0.90 wt % with respect to a total weight of the steel alloy.

In another embodiment the steel is an ultrahigh-carbon steel, with ultrahigh-carbon steels being experimental alloys containing 1.25 to 2.0 wt % carbon with respect to a total weight of the steel alloy.

One metric by which an acid solution may be considered environmentally-friendly is to be biodegradable. A standard method of determining biodegradability is the OCED 301B biodegradation test. This test inoculates a biodegradation solution containing the substances or solution to be tested with a microorganism and incubates the biodegradation solution in the dark or diffuse light. The amount of carbon dioxide produced is measured and compared to a calculated amount of carbon dioxide called the "theoretical $CO_2$". In order to be designated readily biodegradable, 70% of dissolved oxygen content is removed from the biodegradation solution and 60% of theoretical $CO_2$ is produced. In some embodiments, the biodegradable acid solution reaches a plateau of 75 to 99%, preferably 77.5 to 95%, preferably 80 to 90%, preferably 81 to 87.5% of theoretical $CO_2$ by day 40 according to OECD 301B biodegradation test.

The examples below are intended to further illustrate protocols for and are not intended to limit the scope of the claims.

EXAMPLES

Example 1

Material

Water-based drilling fluid was prepared and mixed as shown in Table 1. The drilling fluid contained xanthan gum for viscosity control, starch to prevent filtration, KCl for clay stabilizing, and calcium carbonate ($D_{50}$=50 μm) as a bridging and weighting material. KOH was used to control the pH of the drilling fluid.

TABLE 1

Drill-in Fluid Formula for lab scale

| Material | Units | Amount |
|---|---|---|
| Distilled Water | g | 308 |
| Defoamer | cm³ | 0.33 |
| Xanthan gum | g | 1.5 |
| Starch | g | 6.00 |
| KCl | g | 80 |
| KOH | g | 0.30 |
| Sodium sulfite | g | 0.25 |
| CaCO₃ (50 μm) | g | 30 |

The green biodegradable removal acid (GBRA) in concentrated (100%) form was composed of hydrochloric acid (HCl) in an amount of 20 wt. %, formic acid in an amount of 3-5 wt. %, citric acid in an amount of 3-5 wt. % and water wetting surfactant in an amount of less than 0.5 wt. %. The remaining weight of the GBRA is deionized water (69.5 wt. %). This concentrated form was diluted to 50% and 25% with deionized water.

The GBRA had a density of 1.1 gm/cm³, viscosity of 1.58 cP, the surface tension of 31.4 mN/m and a pH of −1.29. These aforementioned properties were measured at ambient temperature.

Indiana limestone core with an average permeability of 25 mD and has a dimension of 2.5″ diameter and 1.68″ thickness was used to calculate the initial and final permeability

Example 2

Corrosion Test

Figure 2:
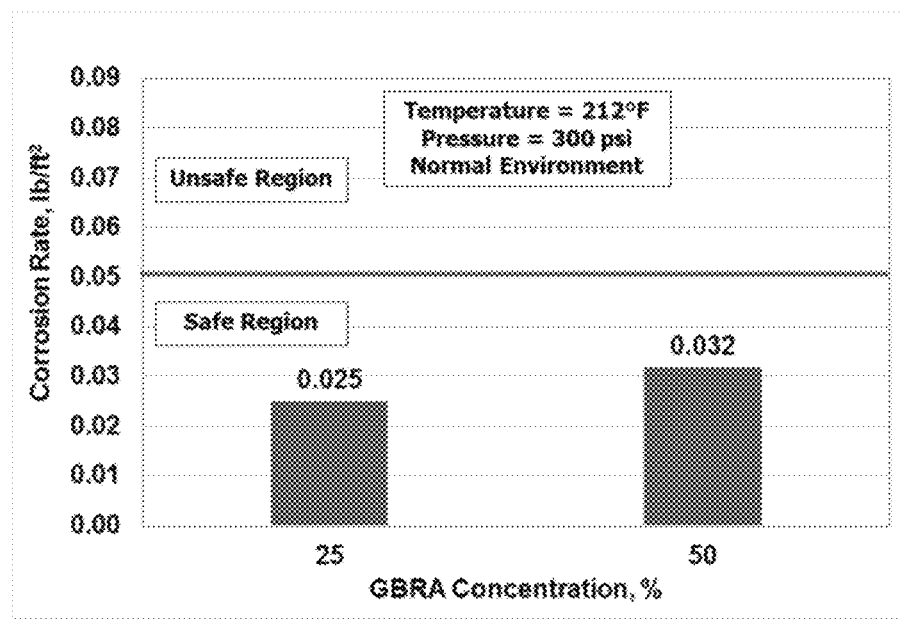
FIG. 2 shows the corrosion rate of steel of two concentrations of the GBRA.

The corrosion rate was performed using 100 cm³ solution which contained 25 and 50 vol. % of GBRA at 212° F. and 300 psi applied presser using an aging cell. FIG. 2 shows the results of the corrosion test. The corrosion rate was 0.032 lb/ft² when using 50% by volume of GBRA, and 0.025 lb/ft² when decreasing the concentration of GBRA to 20 vol. %, both at 212° F. FIG. 3A shows the steel coupon before the corrosion test, and FIG. 3B shows the steel coupon after the corrosion test.

Example 3

Filter Cake Removal

A filtration test was performed for water-based drilling fluid at 212° F. and 300 psi differential pressure using a ceramic disk (25 μm). FIG. 4 shows that the filtrate volume was 10 cm³ after 30 min of filtration. FIGS. 5A-C and 6A-C show that the removal efficiency was greater than 95% when using 200 cm³ removal solution which contains 50 vol. % GBRA and the remaining is deionized water for 6 hrs.

Example 4

Retained Permeability

To evaluate the effect of using GBRA for filter cake removal and formation damage possibility, a real Indiana limestone core was used to perform the filtration test and then the removal process was conducted as described above. FIG. 6A shows the core before filter cake deposition.

The initial core permeability was 25 mD with a dimension of 1.68″ length and 2.5″ diameter. The filtration test was conducted at 212° F. and 300 psi differential pressure. FIG. 6 shows the photo of the core before the filtration test and the formed filter cake on the core surface after the filtration test. FIG. 6B shows the core after filter cake deposition.

The removal process was performed for 20 hrs at 212° F. and 300 psi applied pressure was used with 50 vol. % GBRA. FIG. 6C shows the clean surface of the Indiana core after the removal process confirming the complete removal of the filter cake.

The final permeability was calculated using de-ionized water and it was 23.5 mD. The retained permeability was 94%, confirming that this acid system can be used to remove the internal filter cake formed by fine solid invasion during the filtration process without degrading the core.

Example 5

Biodegradable Test

GBRA is a green acid solution synthesized by a catalytic-reagent combination added to HCl creating a biodegradable, non-bioaccumulating alternative to inhibited and potentially hazardous HCl. The synthesis removes the exothermic reaction created when water is added to HCl and significantly increases the strength of the acid, simultaneously creating a cathodic stimulation reducing the corrosiveness by a factor of 50 at ambient temperatures.

OECD 301B is an aerobic biodegradation test that introduces a material to an inoculum in a closed environment and measures biodegradation of the material by $CO_2$ evolution GBRA samples were provided to an accredited independent laboratory where by using OECD301B Biodegradation testing it was determined that GBRA achieved a plateau of 81% using theoretical carbon dioxide evaluation ($ThCO_2$) measurement by day 40 exceeding the requirements for Ready Biodegradability. The developed fluid had a density of 1.1 gm/cm3, viscosity of 1.58 cP, the surface tension of 31.4 mN/m and a pH of −1.29. These aforementioned properties were measured at ambient temperature.

Example 6

Comparison with 10 vol. % HCl

The titration test was performed for the solution of GBRA and it showed that the concentration of the converted HCl is 20 vol. %. in our experiments, we used 50 vol. % of GBRA which means that the active converted HCl is almost 10 vol. %.

The corrosion rate was conducted at 212° F. and 300 psi applied pressure using 10 vol. % conventional HCl and the results showed that the corrosion rate was very high using conventional HCl. FIG. 7 shows that the corrosion rate using 10 vol. % HCl was 0.68 lb/ft² which very high compared with the corrosion rate when using 50 vol. % GBRA at the same conditions.

The invention claimed is:

1. A method for removing a calcium-containing filter cake from a wellbore, the method comprising:
    contacting the calcium-containing filter cake with a biodegradable acid solution comprising
    69.5 to 93.375 wt % of water,
    5 to 20 wt % of hydrochloric acid,
    0.75 to 3.5 wt % of formic acid,
    0.75 to 3.5 wt % of citric acid, and
    0.0075 to 0.75 wt % of a surfactant, each based on a total weight of the biodegradable acid solution,
    wherein the biodegradable acid solution is contacted with the calcium-containing filter cake at a pressure of 200 to 400 psi, and
    wherein the calcium-containing filter cake comprises water, calcium carbonate, a polymer or starch, and a clay.

2. The method of claim 1, wherein the biodegradable acid solution has a density of 0.90 to 1.25 g/cm$^3$ at 20 to 30° C.

3. The method of claim 1, wherein the biodegradable acid solution has a viscosity of 1.5 to 1.7 cP at 20 to 30° C.

4. The method of claim 1, wherein the biodegradable acid solution has a surface tension of 30 to 33 mN/m at 20 to 30° C.

5. The method of claim 1, wherein the biodegradable acid solution has a pH of −1.5 to −1.1 at 20 to 30° C.

6. The method of claim 1, wherein the calcium-containing filter cake is substantially free of an oil.

7. The method of claim 1, wherein the contacting is performed at a temperature of 50 to 125° C.

8. The method of claim 1, wherein the contacting is performed for 1 to 48 hours.

9. The method of claim 1, wherein a volume ratio of the biodegradable acid solution to the calcium-containing filter cake being contacted is 5:1 to 50:1.

10. The method of claim 1, wherein greater than 92.5% of a volume of the calcium-containing filter cake is removed.

11. The method of claim 1, wherein removing the calcium-containing filter cake from the wellbore increases the permeability of the wellbore by 90 to 100%.

12. The method of claim 1, wherein the method removes the calcium-containing filter cake while causing a corrosion rate of steel of less than 0.049 lb/ft$^2$ per day at 50 to 125° C.

13. The method of claim 1, wherein the biodegradable acid solution reaches a plateau of 75 to 99% of theoretical $CO_2$ by day 40 according to OECD 301B biodegradation test.

14. The method of claim 1, wherein the surfactant is sodium dodecyl sulfate.

15. The method of claim 1, wherein the biodegradable acid solution consists of:
    69.5 to 93.375 wt % of water,
    5 to 20 wt % of hydrochloric acid,
    0.75 to 3.5 wt % of formic acid,
    0.75 to 3.5 wt % of citric acid, and
    0.0075 to 0.75 wt % of a surfactant, each based on a total weight of the biodegradable acid solution.

16. The method of claim 1, wherein the biodegradable acid solution comprises:
    84.75 to 86.75 wt % of water,
    10 wt % of hydrochloric acid,
    1.5 to 2.5 wt % of formic acid,
    1.5 to 2.5 wt % of citric acid, and
    0.25 wt % of a surfactant, each based on a total weight of the biodegradable acid solution.

17. The method of claim 16, wherein the surfactant is sodium dodecyl sulfate.

18. The method of claim 1, wherein the biodegradable acid solution is devoid of hydrofluoric acid.

19. The method of claim 1, wherein the method causes a permeability decrease of no greater than 6% of an initial permeability of a wellbore limestone when performed at 100° C., with a differential pressure of 300 psi, and with a contact time of 6 to 20 hours.

* * * * *